United States Patent [19]

Kapuscinski et al.

[11] Patent Number: 5,474,693
[45] Date of Patent: Dec. 12, 1995

[54] MODIFIERS FOR IMPROVING CLARITY OF MULTIFUNCTIONAL VI IMPROVER OIL COMPOSITIONS

[75] Inventors: Maria M. Kapuscinski, Carmel; Richard A. Abranshe, Yorktown Heights, both of N.Y.

[73] Assignee: Texaco Inc., White Plains, N.Y.

[21] Appl. No.: 405,378

[22] Filed: Mar. 15, 1995

Related U.S. Application Data

[63] Continuation of Ser. No. 754,086, Sep. 3, 1991, abandoned.
[51] Int. Cl.⁶ .................................................. C10M 149/00
[52] U.S. Cl. .............................. 252/50; 252/52 R
[58] Field of Search .................... 252/50, 52, 49.3; 585/10

[56] References Cited

U.S. PATENT DOCUMENTS

| | | | |
|---|---|---|---|
| 4,282,132 | 8/1981 | Benda et al. | 252/51.5 R |
| 4,292,185 | 9/1981 | Bollinger | 252/47.5 |
| 4,693,838 | 9/1987 | Varma et al. | 252/51.5 R |
| 4,699,723 | 10/1987 | Kapuscinski et al. | 252/47 |
| 4,816,172 | 3/1989 | Kapuscinski et al. | 252/47.5 |

*Primary Examiner*—Jacqueline V. Howard

[57] ABSTRACT

A method of producing a clear dispersant OCP VI improver. The method comprises admixing a polar modifier to a VI improver during the preparation process or to a final product at a sufficiently high temperature to produce the desired clear dispersant VI improver.

5 Claims, No Drawings

MODIFIERS FOR IMPROVING CLARITY OF MULTIFUNCTIONAL VI IMPROVER OIL COMPOSITIONS

This a continuation of application Ser. No. 07/754,086, filed on Sep. 03, 1991, now abandoned.

BACKGROUND OF THE INVENTION

This invention relates to viscosity index improver oil compositions, exhibiting reduced haze, and to a process for preparing such compositions.

An important property of a lubricating composition is the rate at which its viscosity changes as a function of temperature. One of the major requirements of lubricating oils is a satisfactory viscosity-temperature characteristic so that the oils will not lose their fluidity but will show an equally good performance within a relatively wide temperature range to which they may be exposed in service. The relationship between viscosity and temperature is commonly expressed as the viscosity index (VI). It has been common practice to introduce long chain hydrocarbon compounds to improve viscosity index of lubricant compositions. It is known to utilize ethylene-alpha olefin copolymers such as ethylene-propylene copolymers as viscosity index improvers. Their structure can be modified to produce multifunctional additives which not only improve the VI, but also impart other properties to oil such as dispersance. Dispersant OCP (DOCP) VI improvers are frequently used in place of simple OCP in motor oil as they dramatically decrease the amount of succinimide dispersant required to maintain a desired performance level. Such VI improvers are based on OCP containing very small amounts (typically about one wt %) of pendant functionality of polar functionality such as an imide or heterocyclic amine, for example pyrrolidone or piperazine.

It is often found during the preparation processing, and/or storage of these various oil soluble hydrocarbon polymers that a haze develops in their oil concentrates. It is believed that the haze in OCP VII is due to presence of a wide variety of catalysts, metal acid salts or copolymers, etc., which are used in Ziegler-Natta copolymerization. In DOCP VI improvers there is an additional source of haze: homopolymer formed from the functional monomer being grafted onto OCP. Thus, for example a typical haze producing agent in DOCP containing groups derived from N-vinylpyrrolidone is polyvinylpyrrolidone.

It has been now discovered that the haze of such VI improver can be reduced or substantially eliminated by the addition thereto or treatment thereof with a small amount of water or diol.

Thus, it is an object of this invention to provide a method for making a clear, high-performing dispersant VI improver.

DISCLOSURE STATEMENT

The art contains many teachings on the use of polymer additives in lubricating oil compositions. Ethylene-propylene copolymers and ethylene-alpha olefin non-conjugated diene terpolymers which have been further derivatized to provide bifunctional properties in lubricating oil compositions illustrate this polymer type of oil additive.

U.S. Pat. No. 3,522,180 discloses a method for the preparation of an ethylene-propylene copolymer substrate effective as a viscosity index improver for lubricating oils.

U.S. Pat. No. 4,089,794 discloses ethylene copolymers derived from ethylene and one of more ($C_3$–$C_{28}$) alpha olefin solution grafted with an ethylenically-unsaturated carboxylic acid material followed by a reaction with a polyfunctional material reactive with carboxyl groups, such as a polyamine, a polyol, or a hydroxylamine which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,146,489 discloses a graft copolymer where the backbone polymer is an oil-soluble ethylene-propylene copolymer or an ethylene-propylene-diene modified terpolymer with a graft monomer of C-vinylpyridine or N-vinylpyrrolidone to provide a dispersant VI improver for lubricating oils.

U.S. Pat. No. 4,908,146 discloses the antihazing additive, a hydrocarbyl substituted succinic acid to be used to clarify oil soluble hydrocarbon viscosity index improver.

U.S. Pat. No. 4,816,172 discloses the method comprising admixing a polar modifier such as polyisobutylene succinimides, polypropylene glycols or esters to a dispersant/antioxidant OCP VI improver containing N-vinylpyrrolidone and phenothiazine.

The disclosures in the foregoing patents which relate to VI improvers, namely U.S. Pat. Nos. 3,522,180; 4,026,809; 4,137,185; 4,146,489; 4,908,146; and 4,816,172; are incorporated herein by reference.

SUMMARY OF THE INVENTION

The present invention provides a method whereby the haze in lubricating oil compositions containing hydrocarbon polymers derivitized with a polar monomer such as N-vinylpyrrolidone (DOCP VI improver) can be reduced by treating the composition, which typically comprises an lubricating oil and from 1 to 50, typically 3 to 20 wt. % based upon the composition, of a soluble hydrocarbon polymeric material containing pendant imide or amine groups and having viscosity index improving characteristics, with a water or polyhydroxy compounds such as 1,4-butanediol. Our invention comprises making clear DOCP VI improver by addition of water or polyhydroxy compound during preparation process or to the finished product.

DESCRIPTION OF THE INVENTION

The base or core polymer which may be employed in practice of the process of this invention may include an oil-soluble, substantially linear, carbon-carbon backbone polymer.

Typical carbon-carbon backbone polymers prepared from monomers bearing an ethylenically unsaturated polymerizable double bond which may be employed include homopolymers or copolymers prepared from monomer

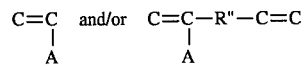

wherein A may be: hydrogen; hydrocarbon such as alkyl, aryl, etc., phenyl; acetate or less preferred acyloxy (typified by —COOR); halide; etc. R" may be divalent hydrocarbon typified by alkylene, alkarylene, aralkylene, cycloalkylene, arylene, etc.

DETAILED DESCRIPTION OF THE INVENTION

The polymer or copolymer substrate employed in the novel additive of the invention may be prepared from ethylene and propylene or it may be prepared from ethylene and a higher olefin within the range of ($C_3$–$C_{10}$) alpha-monoolefins. Hydrogenated styrene-isoprene or styrene butadiene copolymers as well as hydrogenated polyisoprene can also be employed in this invention.

More complex polymer substrates often designated as interpolymers may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohesadiene, dicyclopentadiene, 5-ethylidene-2-norbornene, vinylnorbornene, 5-methylene-2-norborene, 1,5-heptadiene, and 1,6-octadiene. A mixture of more than one diene can be used in the preparation of the interpolymer. A preferred non-conjugated diene for preparing a terpolymer or interpolymer substrate is vinyl norbornene.

The polymers or copolymers of the above-mentioned structures having short or long branches may also be employed.

The preferred carbon-carbon backbone polymers include those selected from the group consisting of ethylene-propylene copolymers (EPM or EPR) and ethylene-propylene-diene terpolymers (EPDM or EPT).

When the charge polymer is an ethylene-propylene copolymer (EPM), it may be formed by copolymerization of ethylene and propylene under known conditions preferably Ziegler-Natta reaction conditions. The preferred EPM copolymers contain units derived from the ethylene in amount of 40–90% mole, preferably 55–80 mole %, say 59 mole %, the remainder being derived from propylene.

The molecular weight $M_n$ of the EPM copolymers which may be employed may be about 5,000 to about 1,000,000, preferably about 20,000 to about 200,000, and most preferably about 140,000. The molecular weight distribution may be characterized by $M_w/M_n$ of less than about 15, preferably 1.2–10, say 1.8.

When the charge polymer is ethylene-propylene-diene terpolymer (EPT or EPDM), it may be formed by copolymerization of ethylene, propylene, and diene monomers. The diene monomer is commonly a non-conjugated diene typified by dicyclopentadiene; 1,4-hexadiene; ethylidene norbornene or vinyl norbornene. Polymerization is effected under known conditions generally comparable to those employed in preparing the EPM products. The preferred terpolymers contain units derived from ethylene in amount of 40–70 mole %, preferably 50–65 mole % say 59 mole % and units derived from propylene in an amount of 20–60 mole %. preferably 30–50 mole %, say 41 mole % and units derived from diene third monomer in amount of 0.2–15 mole %, preferably 0.3–3 mole %, say 0.5 mole %. The molecular weight $M_n$ of the terpolymers may typically be about 5,000 to about 500,000, preferably about 20,000 to about 200,000, and most preferably about 90,000. Molecular weight distribution of the useful polymers is preferably narrow viz a $M_w/M_n$ of typically less than 10, preferably 1.5–5, say about 2.2.

It is a feature of the process of this invention that the graft functional monomers which may be employed (within a polymeric configuration) may be ethylenically unsaturated carbon-carbon amides and/or amines.

The functional dispersant monomer which may be grafted onto the EPM or EPT as graft monomer in practice of the process of this invention may be characterized by the formula RNR'R" wherein R is a hydrocarbon moiety possessing a polymerizable ethylenically unsaturated double bond. R may be an alkenyl or cycloalkenyl group (including such groups bearing inert substituents) typified by vinyl, allyl, C=C—$C_6H_4$—, etc., R" may be hydrogen or a hydrocarbon including alkyl, alkaryl, aralkyl, cycloalkyl, and aryl. The moiety-NR"R', may include a heterocyclic ring (formed by joining R' and R") as in the preferred N-vinyl pyrrolidone; 1-vinyl imidazole; or 4-vinyl pyridine. R' and R" may be hydrogen or a hydrocarbon moiety containing nitrogen, sulfur, or oxygen. Illustrative dispersant monomers which may be employed include those listed below in Table I.

TABLE I

N-vinylpyrrolidone 1-vinylimdazole 4-vinylpyridine allyl amine

The graft monomer may be a more complex reaction product formed by the reaction of an amine, typified by morpholine or N-methyl piperazine, and an epoxy compound typified by allyl glycidyl ether. It may be monomer formed for example from the reaction of croton aldehyde and N-(3-aminopropyl) morpholine.

In practice of the process of this invention, 100 parts of charge EPM or EPT may be added to 100–1000 parts, say 300 parts of solvent. Typical solvent may be a hydrocarbon solvent such as hexane, heptane; tetrahydrofuran, or mineral oil. Preferred solvent may be a commercial hexane containing principally hexane isomers. Reaction mixture may then be heated to reaction conditions of 60° C. at 15–300 psig, preferably 180–220 psig, say 200 psig.

In the typical process, there are admitted to the reaction mixture graft monomer, typically N-vinylpyrrolidone in amount of 1–40 parts, and a solution in hydrocarbon of free radical initiator. Typical free radical initiators may include dicumyl peroxide, di-t-butyl peroxide, benzoyl peroxide, di-isopropyl peroxide, azobisisobutyronitrile, etc. The solvent is preferably the same as that in which the EPM or EPT is dissolved. The initiator may be added in amount of 0.2–10 parts.

The reaction is carried out at a temperature at least as high as the decomposition temperature of the initiator, typically 150° C. or higher.

The reaction is typically carried out at 60°–180 ° C., say 155° C. and 180–220 psig, say 200 psig during which time graft polymerization of the dispersant monomer onto the base EPM or EPT polymer occurs.

Typically, there may be 0.1–80 say 6 dispersant monomer units per 1000 carbon atoms in the polymer backbone.

Lubricating oils in which the dispersant viscosity index improvers of this invention may find use may include auto notice, aircraft, marine, railway, etc., oils; oils used in spark ignition or compression ignition; summer of winter oils; etc. Typically the lubricating oils may be characterized by an bp of 570° F.–660° F., say 610° F.; an ep of 750° F.–1200° F., say 1020° F.; and an API gravity of 25–31, say 29.

The discussion above has been directed to producing a dispersant VI improver. According to the present invention improving, i.e., is made clear and of higher performance, VI improver by the addition of small amounts of polar materials such as water or polydroxy compounds such as 1,4-butane diol.

According to the present invention, the dispersant olefin copolymer VI Improver is made by free radical grafting of unsaturated imide or amine as dispersant monomer with addition of polar modifiers. The addition of a polar modifier significantly improves clarity of the final product.

A. PROCESS

Modifier may be added during preparation process or to the finished product.

1. Modifier added during preparation
  (a) Polymer is added to the diluent-solvent in the reaction vessel or pressure reactor and heated to 80°–160° C. with stirring to form a homogenous solution. Grafting functional monomer and a free radical initiator, typically dicumyl peroxide are charged and the mixture is heated with stirring for a desired time Then diluent oil and 0.02 to 5 wt % of a modifier preferably 0.05 to 0.6 wt. % based on finished product were added and the mixture is heated with stirring at temperature 50° to 150° C., preferably at 60° to 90° C. under nitrogen pressure.

2. Modifier Added to Finished Product

A mixture of the finished product (DOCP VI improver), and modifier, typically 1,4-butanediol, is heated under nitrogen pressure with vigorous stirring for 30–360 minutes, preferably 60–180 minutes at 60°–240° C., preferably at 120°–160° C. Amount of modifier needed is in the range of 0.02 to 1.0 parts, preferably 0.05 to 0.6 parts per 100 parts of VI improver.

B. MODIFIERS

1. Distilled Water
2. Diols
   1,4-butanediol
3. Polypropylene glycols
   Molecular weights in the range of 200 to 2000. For example Texox 400 (Texaco Chemical Company of Houston, Tex.).

C. Evaluation of Clarity

Clarity of neat VI improvers was evaluated visually and using the Texaco Hazitron which measure the amount of light scattered by the sample. With higher haze the Hazitron number increases. For clear additive the Hazitron numbers are typically below 13.

DETAILED DESCRIPTION OF THE INVENTOR

In order to show the effectiveness of the present invention, the following Examples are provided to show the advantages thereof.

EXAMPLE 1

In this example a DOCP VI improver used for clarification study is based on OCP containing N-vinylpyrrolidone grafted onto polymer backbone. The approximately 9 wt % oil solution of ethylenepropylene copolymer (EPM) (Mn~132,000 as measured by SEC) containing about 60 mol % of ethylene and 1.5 wt % N-vinylpyrrolidone grafted was studied. 100 wt. parts of DOCP VI improver and 0.4 wt parts of 1,4 butanediol were heated with vigorous stirring under nitrogen pressure for 30 minutes at 80° C. The product is used as it is for further testing.

EXAMPLE 2

In Example 2, the 1,4-butanediol procedure of Example 1 is followed except that 0.2 wt. parts of 1,4 butanediol is used.

EXAMPLE 3

In Example 3, the 1,4 butanediol procedure of Example 1 is followed except that 0.1 wt. parts of butanediol is used.

EXAMPLE 4

In Example 4, the procedure of Example 1 is followed except that 0.2 wt. parts of water is used.

EXAMPLE 5

In Example 5, the procedure of Example 1 is followed except that 0.4 wt. parts of water is used.

EXAMPLE 6

In Example 6, the procedure of Example 1 is followed except that 0.6 wt. parts of water is used.

EXAMPLE 7

In Example 6, the procedure of Example 5 is followed except that 0.4 wt. parts of 1,2,4-butanetriol is used.

EXAMPLE 8

In Example 7, the procedure of Example 6 is followed except that 0.4 wt. parts of 1,2,6-trihydroxy hexane was used.

EXAMPLE 9

In Example 9, the procedure of Example 7 is followed except that 0.4 wt. parts of polypropylene glycol (Texox 400) was used.

EXAMPLE 10

In Example 10, the procedure of Example 7 is followed except that 0.4 wt. parts of propylene glycol was used.

EXAMPLE 11

In Example 11, the procedure of Example 10 is followed except that 0.4 wt. parts of 1-methyl-2-pyrrolidone was used.

EXAMPLE 12

In Example 12, used as a reference, the procedure of Example 1 is followed except that no clarity modifier was added

RESULTS

The evaluation data for the samples of Examples 1–12 are listed below in Table II. The sample numbers are related to the Example numbers.

As shown below in Table II, Samples which were treated with 0.2–0.4 wt. % of water or 1,4-butanediol were clearer than any sample studied. The clarity of samples with modifiers were compared with the reference sample 12*. The samples of Examples 1–5, 9 and 11 were clearer (the Hazitron numbers lower) then the reference sample 12*. Clarity of VI improver vs, clarity modifier type used in the above Examples can be ordered as follows:

| Example # | 1 and 2 | 3 and 4 | 9 | 10 | 12 |
|---|---|---|---|---|---|
| (better)<--- | 1,4-butanediol > | water > | Texox 400 – | 1-methyl-2-pyrrolidone | >>none |

Samples 7 and 10 treated with 1,2,4-butanetriol or propylene glycol, respectively, did not give any improvement in clarity. Addition of an excess of water (sample 6) or treating the VI improver with 1,2,6-trihydroxyhexane (8) gave products of higher haziness.

TABLE II

Turbidity of DAOCP VI Improver vs Modifier Addition

| Example # | Modifier Type | Amount g/100 g VII | Visual Clarity | Hazitron Clarity |
|---|---|---|---|---|
| 1 | 1,4-butanediol | 0.4 | clear | 8 |
| 2 | " | 0.2 | " | 7 |
| 3 | " | 0.1 | slightly hazy | 12 |
| 4 | water | 0.2 | slightly hazy | 15 |
| 5 | " | 0.4 | clear | 7 |
| 6 | " | 0.6 | very hazy | — |
| 7 | 1,2,4-butanetriol | 0.4 | hazy | 18 |
| 8 | 1,2,6-trihydroxy-hexane | 0.4 | hazy | 30 |
| 9 | Texox 400 | 0.4 | slightly hazy | 13 |
| 10 | Propylene glycol | 0.4 | hazy | 19 |
| 11 | 1-methyl-2-pyrrolidone | 0.4 | slightly hazy | 13 |
| 12* | None | — | hazy | 19 |

We claim:

1. A method of making a clear dispersant olefin copolymer VI improver comprising mixing a dispersant VI improver with a polar modifier, selected from the group consisting of diols, water and 1-methyl-2-pyrrolidone at a temperature of about 50° C. to about 200° C. for a period of about 5 to about 20 minutes to provide a clear dispersant VI improver product.

2. The method of claim 1, wherein said dispersant olefin copolymer VI improver is based on ethylene-propylene copolymer or ethylene-propylene terpolymer reacted with a dispersant monomer containing an unsaturated imide or amine.

3. The method of claim 1, wherein said polar modifier is present in the amount of about 0.2 to about 20.0 weight parts per 100 weight parts of polymer.

4. The method of claim 1, wherein said polar modifier is present in the amount of about 0.02 to about 2.0 weight parts per 100 weight parts of VI improver.

5. A method of making a clear dispersant olefin copolymer VI improver comprising mixing a dispersants VI improver with 1,4-butanediol or 1-methyl-2-pyrrolidone at a temperature of about 50° C. to about 200° C. for a period of about 5 to about 20 minutes to provide a clear dispersant VI improver product.

* * * * *